US009619956B2

(12) United States Patent
Contorer et al.

(10) Patent No.: US 9,619,956 B2
(45) Date of Patent: Apr. 11, 2017

(54) SYSTEMS AND METHODS FOR REMAKING BALLOTS

(71) Applicant: Everyone Counts, Inc., San Diego, CA (US)

(72) Inventors: Aaron Contorer, San Diego, CA (US); Sean Mostafavi, San Diego, CA (US); Jim Goode, San Diego, CA (US); Elan Kaplan, San Diego, CA (US); Carolyn Hicks, Melbourne (AU); Jon Thomason, San Diego, CA (US)

(73) Assignee: Everyone Counts, Inc., San Diego, CA (US)

( * ) Notice: Subject to any disclaimer, the term of this patent is extended or adjusted under 35 U.S.C. 154(b) by 107 days.

(21) Appl. No.: 14/550,339

(22) Filed: Nov. 21, 2014

(65) Prior Publication Data

US 2015/0076228 A1    Mar. 19, 2015

Related U.S. Application Data

(63) Continuation of application No. 13/433,042, filed on Mar. 28, 2012, now Pat. No. 8,899,480.

(60) Provisional application No. 61/468,522, filed on Mar. 28, 2011.

(51) Int. Cl.
   *G07C 13/00*    (2006.01)

(52) U.S. Cl.
   CPC .................................. *G07C 13/00* (2013.01)

(58) Field of Classification Search
   USPC ........................................................ 235/386
   See application file for complete search history.

(56) References Cited

U.S. PATENT DOCUMENTS

| 3,790,073 | A | 2/1974 | Martin et al. |
| 4,641,240 | A | 2/1987 | Boram |
| 4,641,241 | A | 2/1987 | Boram |
| 4,649,264 | A | 3/1987 | Carson |

(Continued)

FOREIGN PATENT DOCUMENTS

| EP | 0292053 A1 | 11/1988 |
| GB | 2448955 A | 11/2008 |

(Continued)

OTHER PUBLICATIONS

U.S. Appl. No. 13/433,042, Mar. 28, 2012.

(Continued)

*Primary Examiner* — Michael G Lee
*Assistant Examiner* — David Tardif
(74) *Attorney, Agent, or Firm* — Mintz Levin Cohn Ferris Glovsky and Popeo, P.C.

(57) ABSTRACT

Voter-generated ballots created using consumer-grade printers are remade to ballots scannable by specialized ballot scanners. The voter-generated ballots include a machine-readable indicia, such as a two-dimensional barcode, that encodes ballot information. The ballot information includes choices made by the voter and information for use in remaking the ballot. Voters wish to submit their votes using printouts from non-specialized printers such as those found at their homes or offices; yet election officials wish to tabulate votes using scanners that require specialized, high-quality ballots. The disclosed systems and methods bridge this gap.

28 Claims, 4 Drawing Sheets

(56) References Cited

U.S. PATENT DOCUMENTS

| | | | |
|---|---|---|---|
| 5,218,528 A | 6/1993 | Wise et al. | |
| 5,278,753 A | 1/1994 | Graft, III | |
| 5,355,414 A | 10/1994 | Hale et al. | |
| 5,400,248 A | 3/1995 | Chisholm | |
| 5,821,508 A | 10/1998 | Willard | |
| 5,875,432 A | 2/1999 | Sehr | |
| 5,878,399 A | 3/1999 | Peralto | |
| 6,081,793 A | 6/2000 | Challener et al. | |
| 6,250,548 B1 | 6/2001 | McClure et al. | |
| 6,412,692 B1 | 7/2002 | Miyagawa | |
| 6,550,675 B2 | 4/2003 | Davis et al. | |
| 6,662,998 B2 | 12/2003 | McClure et al. | |
| 6,688,517 B1 | 2/2004 | McClure et al. | |
| RE38,637 E | 10/2004 | Willard | |
| 6,865,543 B2 | 3/2005 | Gibbs, Sr. | |
| 6,968,999 B2 | 11/2005 | Reardon | |
| 7,032,821 B2 | 4/2006 | McClure et al. | |
| 7,055,742 B2 | 6/2006 | Sinha | |
| 7,152,156 B1 | 12/2006 | Babbitt et al. | |
| 7,237,717 B1 | 7/2007 | Rao et al. | |
| 7,406,480 B2 | 7/2008 | Seibel et al. | |
| 7,406,780 B2 | 8/2008 | Doh et al. | |
| 7,422,150 B2 | 9/2008 | Chung | |
| 7,464,874 B2 | 12/2008 | Donner | |
| 7,497,377 B2 | 3/2009 | Watson | |
| 7,516,892 B2 * | 4/2009 | Haas | G07C 13/00 235/386 |
| 7,537,159 B2 | 5/2009 | Mugica et al. | |
| 7,565,540 B2 | 7/2009 | Bogasky et al. | |
| 7,597,258 B2 | 10/2009 | Feldkamp et al. | |
| 7,640,181 B2 | 12/2009 | McClure et al. | |
| 2002/0082907 A1 | 6/2002 | Inomata et al. | |
| 2002/0128978 A1 | 9/2002 | Neff | |
| 2002/0152379 A1 | 10/2002 | Gefwert et al. | |
| 2002/0161628 A1 | 10/2002 | Lane Poor et al. | |
| 2003/0173404 A1 | 9/2003 | Chung et al. | |
| 2004/0024635 A1 | 2/2004 | McClure et al. | |
| 2004/0028190 A1 | 2/2004 | Golden | |
| 2004/0046021 A1 | 3/2004 | Chung | |
| 2004/0128190 A1 | 7/2004 | Campo et al. | |
| 2004/0195323 A1 | 10/2004 | Vadura et al. | |
| 2005/0145695 A1 | 7/2005 | Kelly | |
| 2005/0211778 A1 * | 9/2005 | Biddulph | G07C 13/00 235/386 |
| 2005/0247783 A1 | 11/2005 | Poulos et al. | |
| 2006/0041468 A1 | 2/2006 | Reardon | |
| 2006/0060649 A1 | 3/2006 | Brucker et al. | |
| 2006/0070119 A1 | 3/2006 | Ogram | |
| 2006/0266829 A1 | 11/2006 | Bolton et al. | |
| 2007/0007340 A1 | 1/2007 | Mugica et al. | |
| 2007/0267493 A1 | 11/2007 | Coutts | |
| 2008/0105742 A1 | 5/2008 | Kim et al. | |
| 2008/0308633 A1 | 12/2008 | Bolton et al. | |
| 2009/0037260 A1 | 2/2009 | Felten et al. | |
| 2009/0173778 A1 * | 7/2009 | Cummings | G07C 13/02 235/51 |
| 2011/0114724 A1 | 5/2011 | Lee | |
| 2012/0061468 A1 | 3/2012 | Arnao et al. | |
| 2012/0095810 A1 | 4/2012 | Miao et al. | |
| 2012/0164982 A1 | 6/2012 | Klein | |
| 2012/0173307 A1 | 7/2012 | Moore et al. | |
| 2012/0217299 A1 * | 8/2012 | Vall S Fontanals et al. | G07C 13/00 235/386 |
| 2012/0261470 A1 | 10/2012 | Valle S. Fontanals et al. | |

FOREIGN PATENT DOCUMENTS

| | | |
|---|---|---|
| JP | 2001209834 A | 8/2001 |
| JP | 2002318574 A | 10/2002 |
| JP | 2002352039 A | 12/2002 |
| JP | 2003022343 A | 1/2003 |
| JP | 2003256900 A | 9/2003 |
| KR | 2009-0001497 A | 1/2009 |
| KR | 10-0999346 B1 | 12/2010 |
| WO | WO-2009103014 A2 | 8/2009 |

OTHER PUBLICATIONS

"Safevote to Provide Technology for Sweden's First Internet Election", Business Wire, p. 0288; Mar. 15, 2001.
Anonymous, "Simple and secure electronic voting with Pret a Voter", Feb. 28, 2008.
Benaloh, et al., "Receipt-Free Secret-BAllot Elections (Extended Abstract", retrieved from the Internet: : <http://research.microsoft.com/en-us/um/people/benaloh/papers/rfe.ps>.
Benaloh, et al., "STAR-Vote Secure, Transparent, Auditable, and REliable Voting System", PowerPoint Presentation, Jul. 18, 2012.
Benaloh, et al., "STAR-Vote: A Secure, Transparent, Auditable, and Reliable Voting System", retrieved from the Internet: <http://arxiv.org/abs/1211.1904>.
Benaloh, J., "Administrative and Public Verifiability: Can We Have Both?", Jun. 30, 2008, retrieved from the Internet: http://static.usenix.org/events/evt08/tech/full_papers/benaloh/benaloh.pdf>.
Boughton, "Maintaining Democratic Values in e-Voting with eVACS", Lecture Notes in Informatics—Proceedings; Electronic Voting 2006; Aug. 2-4, 2006.
Craig et al., "Toward a System of Checks and Balances for Electronic Voting Machines", Proceedings of the 2009 Information Security Curriculum Development Annual Conference, InfoSecCD '09.
Derfler et al., "How Networks Work", 7th Ed., Que Corporation, Oct. 18, 2004.
Election Systems and Software, Inc., ES&S Image Manager User's Guide, Mar. 26, 2006.
Electronic Voting, Next Generation Voting Technology—Products Website.
Florida Department of State, Florida Administrative Register & Florida Administrative Code, Notice "1S-2.030 Electronic Transmisison of Absente Ballots", from website www.flrules.org.
International Search Report and the Written Opinion dated Jan. 25, 2013 for PCT/US2012/043825.
International Search Report and Written Opinion from PCT/IB2008/001038 issued Aug. 20, 2008.
Ka-Ping Yee, "Building Reliable Voting Machine Software", Dissertation submitted to the Graduate Division of the University of California, Berkeley in partial fulfillment of the requirements for the degree of Doctor in Philosophy in Computer Science, Fall 2007.
Ka-Ping Yee, "Extending prerendered-interface voting software to support accessability and other ballot features", retrieved from the Internet: <http://static.usenix.org/event/evt07/tech/full_papers/yee/yee_html/>.
Kiayias et al., "An Authentication and Ballot Layout Attack against an Optical Scan Voting Terminal", Proceedings of the USENIX Workshop on Accurate Electronic Voting Technology; 2007.
Office Action in EP 08750857.8 issued Feb. 4, 2010.
Office Action in EP08750857.8 issued Apr. 26, 2013, 4 pages.
PCT International Search Report and Written Opinion dated Jan. 25, 2013, for PCT/US2012/043825.
PCT International Search Report and Written Opinion dated Oct. 30, 2012, for corresponding PCT application No. PCT/US2012/030970.
PCT International Search Report and Written Opinion dated Oct. 30, 2012, for PCT application No. PCT/US2012/030970.
Remmert, M., "Towards European Standards on Electronic Voting", Lecture Notes in Informatic—Proceedings; Electronic Voting in Europe Technology, Law, Politics and Society; Workshop of the ESF TED Programme together with GI and OCG; Jul. 7-9, 2004.
Safevote—Products Website.
White, Ron, "How Computers Work", 9th Ed., Que Corporation, Nov. 14, 2007.
Xenakis et al., "Procedural Security Analysis of Electronic Voting", Proceedings of the 6th international conference on Electronic commerce, pp. 541-546.

(56) References Cited

OTHER PUBLICATIONS

XP002456414—Statement in Accordance with the Notice from the European Patent Office (OJ EPO Nov. 2007, 592-593) dated Oct. 1, 2007, 1 page.
International Search Report and Written Opinion dated Sep. 30, 2013 for PCT application No. PCT/US013/049792.

* cited by examiner

402 → version: 1.2

404 → ballot-design-id: BL15.pdf

406 → ballot-style: Typ:01 Seq:0015 Spl:01

408 → ballot-type: 1

410 → id: 44444447

412 → remake-type: filled

420a → 1:1

420b → 2:1

420c → 3:2

← 420d

420e → 5:1

420f → 6:3

420g → 7:1

420h → 8:2

420i → 9:1

420j → 10:2

420k → 11:1

420l → 12:2,5

420m → 13:"4-Sean Mostafavi"

420n → 14:"5-Aaron Contorer","6-Mark Miller","7-Elan Kaplan"

FIG. 4

SYSTEMS AND METHODS FOR REMAKING BALLOTS

CROSS-REFERENCE TO RELATED APPLICATIONS

This patent application is a continuation of and claims the benefit of priority under 35 U.S.C. §120 of U.S. patent application Ser. No. 13/433,042, entitled "Systems And Methods For Remaking Ballots", filed Mar. 28, 2012, which claims the benefit of priority of U.S. Provisional Patent Application No. 61/468,522, filed Mar. 28, 2011, entitled "Systems And Methods For Remaking Ballots". The disclosures of each document mentioned in this paragraph are incorporated herein by reference in their entirety.

BACKGROUND

The present invention relates to electronic voting and to systems and methods for remaking ballots printed by voters using consumer-grade printing equipment into ballots readable by specialized ballot scanners.

Providing remote voting allows greater participation in elections. Some voters may be unable to go to a polling place, for example, deployed military personnel. It may be difficult for other voters to vote using traditional ballots, for example, those with disabilities.

It is expected that elections will be administered skillfully so that integrity of the results is assured including that voters' choices are kept secret, eligible voters are allowed to vote for the contests for which they are authorized to cast votes, and all votes are accurately counted. Election officials have established various procedures to carry out their duties. For example, using official ballot scanners to automatically count paper ballots that use special paper stock, where the accuracy of the particular combination of scanners and ballots has be established. However, remotely-cast votes are difficult to process using these procedures.

SUMMARY

Systems and methods for electronic voting are provided. In one aspect, the invention provides a method for remaking ballots. The method includes: receiving a voter-generated physical ballot including a machine-readable indicia that encodes an indication of choices of a voter; scanning the voter-generated physical ballot; decoding the scanned machine-readable indicia to determine the choices of the voter; and printing a remade ballot including indications of the choices of the voter, the remade ballot being readable by a ballot scanner.

In another aspect, the invention provides a method for tabulating ballots. The method includes: receiving a voter-generated physical ballot including a machine-readable indicia that encodes an indication of choices of a voter; scanning the voter-generated ballot; decoding the scanned machine-readable indicia into the choices of the voter; and tabulating the decoded choices of the voter.

In another aspect, the invention provides a system for processing ballots. The method includes: supplying an electronic ballot from an election server to a client device for use by a voter, the electronic ballot comprising information regarding one or more contests; receiving one or more indications of choices for the contests from the voter; transferring the indications of the choices for the contests to an election office; and printing a remade ballot including indications of the choices of the voter, the remade ballot being readable by a ballot scanner.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 is a listing of information contained in a machine-readable indicia of an example voter-generate ballot in accordance with aspects of the invention.

DETAILED DESCRIPTION

Figure 1:
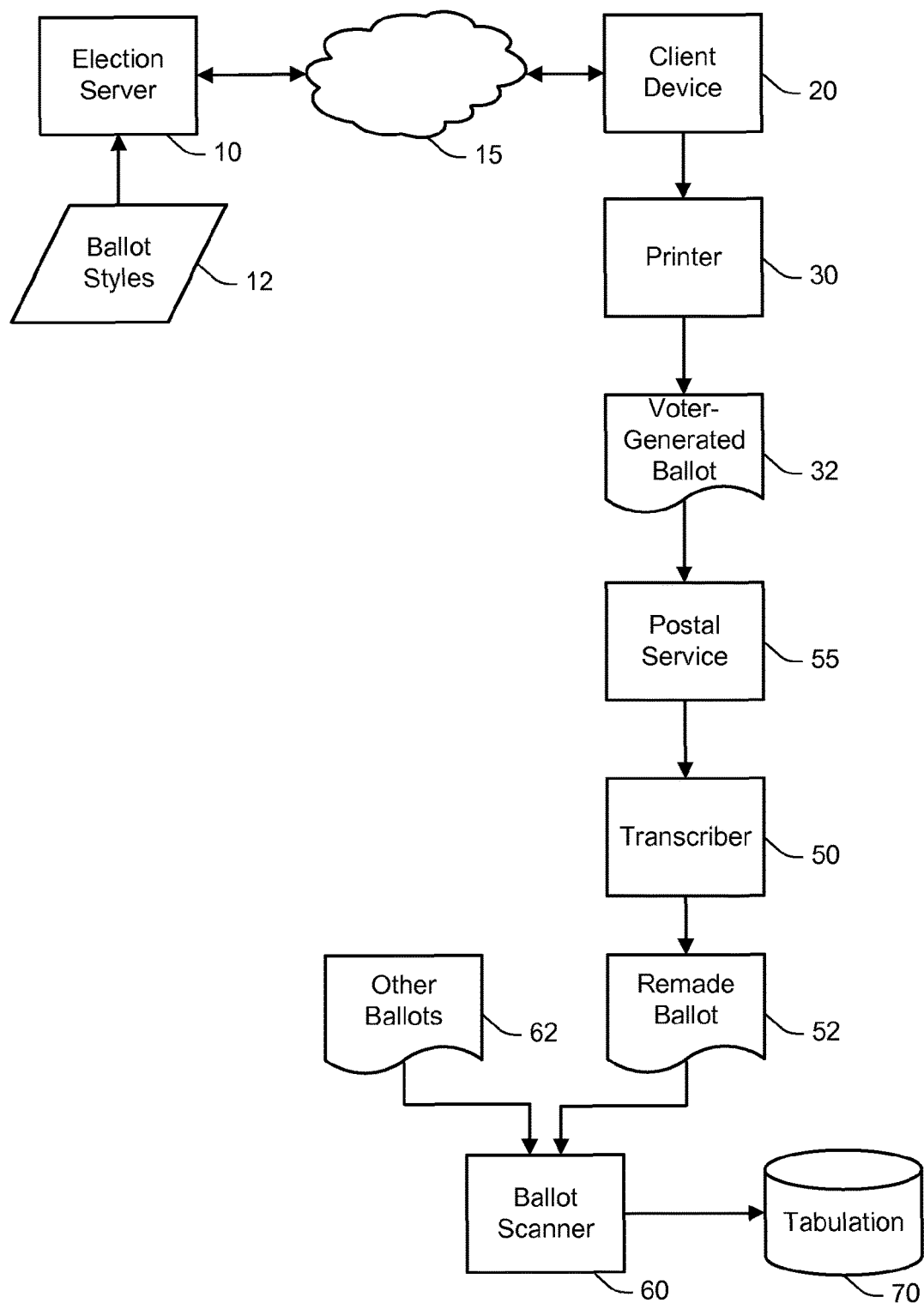
FIG. 1 illustrates a system for remaking ballots in accordance with aspects of the invention.

FIG. 1 illustrates a system for remaking ballots. A voter uses a client device 20 to access an election server 10 via a network 15. The election server 10 supplies a ballot to the client device 20 based ballot styles 12. The voter selects choices for contests on the ballot using the client device 20. The completed ballot is printed user printer 30 to create a voter-generated ballot 32 that includes a machine-readable indicia that indicates the voter's choices. The voter-generated ballot is sent via a postal service 55 to an election office where a transcriber 50 scans the voter-generated ballot and decodes the voter's choices. The transcriber 50 prints a remade ballot 52 that is formatted like conventional ballots. A ballot scanner 60 scans the remade ballot 52 along with other ballots 62. The ballot scanner 60 supplies votes from the scanned ballots 62 to a tabulation 70.

The election server 10 is configured to allow voters to remotely access ballots through the network 15. The network 15 may be the Internet, a telephone network, or other communication networks. In an embodiment, the election server 10 is a networked computer server configured to run the eLect Today suite of election software from Everyone Counts, Inc.

The election server 10 uses one or more ballot styles 12 to supply ballots to voters. The ballot styles 12 include ballot information to be presented to voters and may also include formatting information for how the ballot information is to be presented. The ballot styles 110 can be provided to the election server 10 by an Election Management System (EMS). The ballot styles 12 may be in many formats, such as Portable Document Format (PDF), MICROSOFT WORD documents, Extensible Markup Language or other types of markup language files, comma-separated values (CSV), and Election Markup Language (EML) format files.

The voter accesses the election server 10 using the client device 20. The client device 20 includes computing, user interface, and communication functions. Example client devices include personal computers, notebook computers, tablet computers, and smart phones. When the client device 20 accesses the election server 10, the voter can be provided a login page for the voter to supply identification information. The identification information can include information such as a voter identification number provided by election officials, a social security number or tax identification number assigned by a state or federal government, a password, a machine-readable secure identity card, and biometric information such as a fingerprint.

The election server 10 uses the identification information to authenticate the voter's eligibility to vote in particular contests. The election server 10 can use the authenticated identification information to identify the correct ballot style 12 to present to the voter.

The election server 10 uses characteristics, for example, residence and political party registration, of the voter to determine which ballot style to use. The characteristics may be based on electoral role information that election officials have provided to the election server 10. The voter can use the client device 20 to make his or her choices on the ballot presented by the election server 10. The choices may be made, in various embodiments, by way of a web page where the voter can fill out choices, or an editable form that the user can fill out, such as a PDF document. In some embodiments, the client device 20 downloads a custom application from the election server 10 and executes the custom application to present the ballot information to the voter and to receive the voter's choices.

Once the voter has voted, in the embodiment illustrated in FIG. 1, ballot information is sent from the client device 20 to the printer 30 where the voter-generated ballot 32 is printed. The client device 20 may be coupled to the printer 30 by a wired or wireless connection. The connection from the client device 20 to the printer 30 may include intermediate devices. The printer 30 can be ordinary printer using ordinary paper that is commonly available in many households and offices. That is, the printer 30 is not specialized for printing ballots.

Printing of the voter-generated ballot 32 can be triggered by a "print ballot" function on the user interface of the client device 20. The "print ballot" function can be made available on the client device 20 after error checking, voter confirmation, and the like.

The voter-generated ballot 32 includes the machine-readable indicia that encodes information about the ballot. The machine-readable indicia may be a linear barcode, a two-dimensional barcode, or some other machine-readable indicia producible by the printer 30. The machine-readable indicia, in an embodiment, encodes 800 bytes of information. The amount of information may be chosen based on criteria including a tradeoff between the amount of information versus the size or robustness of the machine-readable indicia. The machine-readable indicia can be created at the election server 10 or at the client device 20.

The information encoded by the machine-readable indicia is, in some embodiments, a coding of the actual ballot information including the choices made by the voter. In other embodiments, the information encoded by the machine-readable indicia is an identifier of the ballot. The identifier can be mapped to the voter's choices at the election office. The voter-generated ballot 32 usually does not contain any information that could be used to identify the voter.

The machine-readable indicia may be encrypted to prevent reading by unauthorized parties. The machine-readable indicia can include redundant information to facilitate decoding of a poorly printed or damaged voter-generated ballot. The machine-readable indicia can be chosen to be tolerant of printing that is the wrong size, printing that is on the wrong kind of paper, printing that uses ink that is faint, printing that is skewed or rotated, and other problems that could preclude scanning by election officials using official ballot scanners.

In some embodiments, the voter-generated ballot 32 includes human-readable ballot information. The human-readable ballot information may appear substantially like a conventional ballot. The voter may view the human-readable ballot information to confirm that the voter-generated ballot 32 contains the voter's intended choices. The human-readable ballot information can also be used by election officials to manually tabulate ballots that cannot be automatically processed.

An affidavit may be printed in addition to the voter-generated ballot 32. The affidavit can be executed by the voter to swear that she is the person that she has represented herself to be and that she is authorized to cast the votes on the ballot. The content and existence of the affidavit depends on the jurisdiction in which the ballot is cast. Mailing instructions including instructions for folding the voter-generated ballot 32 can also be printed.

The voter sends the voter-generated ballot 32 to the election office via the postal service 55. The postal service 55 may be a government postal service or a private deliver service. When used, the affidavit is sent to the election office with the voter-generated ballot 32. At the election office, the received documents can be verified according to the procedures established for the particular election. The procedures may include sorting voter-generated ballots from other types of ballots received by the election office.

The voter-generated ballot 32 is scanned by the transcriber 50 at the election office. The transcriber 50 can include multiple machines, for example, a scanning device and a printing device. The transcriber 50 reads the machine-readable indicia from the voter-generated ballot and decodes the information about the ballot. The transcriber 50 uses the information to determine the format and contents of the corresponding official-format ballot. The format and contents of the corresponding official-format ballot may be directly contained in the information from the machine-readable indicia or may be looked up based on an identifier contained in the machine-readable indicia.

The transcriber 50 prints the remade ballot 52 in a form that can be scanned by the ballot scanner 60. The transcriber 50 may include or be coupled to a computer server that stores information on how to format the remade ballot 52. The remade ballot 52 may printed on special paper stock of a special size and using special ink. The specialized printing is according to characteristics of the ballot scanner 60 to be used. The transcriber 50 may print the voter's choices on preprinted ballot stock or print the full ballot on blank paper.

In some embodiments, the transcriber 50 analyzes any human-readable information on the voter-generated ballot 32. The transcriber 50 can compare the human-readable information to the information from the machine-readable indicia. If a discrepancy exists, the transcriber 50 can indicate that the voter-generated ballot 32 should be examined by election officials. Additionally, the transcriber 50 can flag those voter-generated ballots that the transcriber 50 cannot read for manual processing by an election official.

The remade ballot 52 is scanned by the ballot scanner 60 and the voter's choices sent to the tabulation 70. The ballot scanner 60 commonly has a low tolerance for error or variation in the ballots it scans. For example, the ballot scanner 60 may need heavy, odd-sized paper with very precisely positioned ovals and heavy black calibration marks. The ballot scanner 60 also scans other ballots 62 received at the election center. The other ballots 62 may be ballots from precinct polling places.

Although FIG. 1 illustrates a single instance of each element, it should be understood that a system may include multiple instances of the various elements. For example, each system will generally include many remade ballots that where remade from many voter-generated ballots created for voters using many different client devices.

In an alternative system, the voter's choices are received electronically by the election center rather than on the paper voter-generated ballot 32. In an embodiment, the client device 20 is taken to the election center or a polling station to signal the voter's choices for tabulation. For example, the machine-readable indicia may be read by the transcriber 50 from a display on the client device 20. In another embodiment, the transcriber 50 receives indications of the voter's choices from another device, for example, a magnetic strip or a memory device. Alternatively, the voter's choices may be communicated to the transcriber 50 via wireless transmission, for example, using Bluetooth or infrared communication. The voter's choices may also be communicated remotely by the client device 20 to the election center, for example, via the election server 10.

In another alternative, the voter-generated ballot 32 tabulated directly by the transcriber 50 and the remade ballot 52 is not printed.

A system may provide combinations of the foregoing methods for communicating ballot choices. For example, in one election, some voters may print and mail paper voter-generated ballots while other voters may submit their choices electronically.

Figure 2:
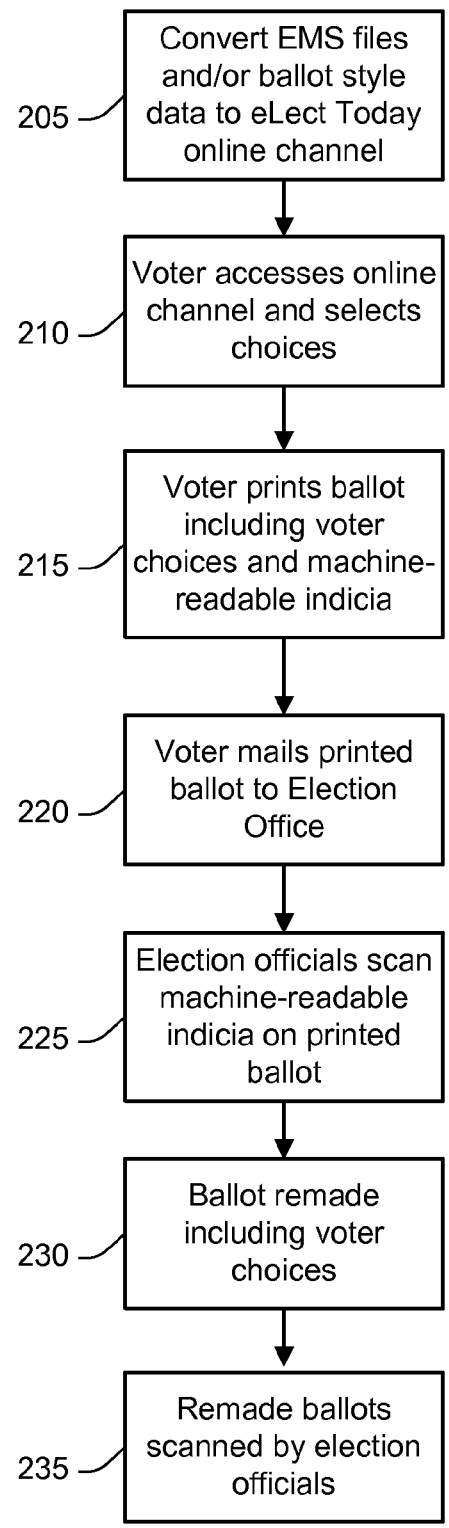
FIG. 2 is flow diagram of a method for remaking voter-generated ballots in accordance with aspects of the invention.

FIG. 2 is flowchart of a process for remaking voter-generated ballots into marked optical scan ballots. The process illustrated in FIG. 2 may be used in conjunction with the system illustrated in FIG. 1.

In step 205, the process converts Election Management System (EMS) files that include ballot data into a version that can be accessed via an online channel. For example, an EMS process can be used to generate an official ballot for an election, and the official ballot can be converted into one or more ballot styles that can be made available for access by voters online. The voters may be provided an access code or other authentication credentials that can be used to limit the access to the online ballots to those who are eligible to vote in the election. The credentials can be assigned such that they are not associated with any voter-specific identification information that could be used to associate a particular voter with a ballot generated using the authentication credentials.

In step 210, once the ballot is available online, a voter can access the online ballot and make his or her choices in the election.

In step 215, the voter than prints out the ballot that includes the vote choices indicated by a machine-readable indicia that can be scanned by election officials to remake the ballot.

In step 220, the voter then mails the ballot and, in some embodiments, an affidavit to election officials.

In step 225, the election officials receive the voter-generated ballots in the mail. The election officials also receive other types of absentee ballots that are sorted from the voter-generated ballots. The voter-generated ballots are scanned to decode information in the machine-readable indicia. Election officials may validate each voter using information provided in the affidavit before processing the voter-generated ballot to ensure that the voter was entitled to vote in the election and to ensure that the voter has not already voted in the election. Election officials may also track which voters have submitted ballots based on the scanned information.

In step 230, the process uses the decoded information to remake the voter-generated ballots into remade ballots. The transcriber 60 of the system of FIG. 1 can by used to scan the machine-readable indicia and print the remade ballots.

In step 235, the remade ballots are scanned by election officials using a ballot scanner. The choices indicated on the remade ballots can then be tabulated.

Figure 3:
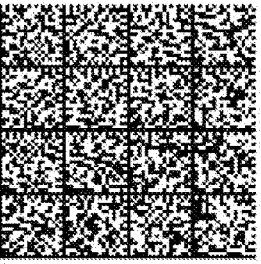
FIG. 3 illustrates an example of a voter-generated ballot in accordance with aspects of the invention.

FIG. 3 illustrates an example of a voter-generated ballot. The voter-generated ballot of FIG. 3 can be used in the system of FIG. 1 and the method of FIG. 2. The illustrated ballot includes a title section 301, a human-readable section 311, and machine-readable indicia 321. The title section 301 identifies the election that the ballot pertains to. The human-readable section 311 shows the voter's choices in the contests on the ballot. The machine-readable indicia 321 encodes the voter's choices in a form that can be read by election equipment. The machine-readable indicia 321 may also contain various parameters and values that indicate formatting information include formatting of the machine-readable indicia 321.

The machine-readable indicia 321, in the illustrated example, is a Data Matrix two-dimensional barcode. Although the machine-readable indicia 321 is positioned in FIG. 3 at the lower right of the voter-generated ballot, other positions may also be used. For example, a central position may provide improved tolerance to ballot margins that may vary between printers and web browsers.

FIG. 4 is a listing of information contained in a machine-readable indicia of an example voter-generate ballot. The information of FIG. 3 can be used with the system of FIG. 1, the method of FIG. 2, and the ballot of FIG. 3. The example ballot encodes the information as text. In other embodiments, the information may be encoded differently, for example, in binary form.

The information includes a version parameter 402. The value of the version parameter 402 identifies the version of the machine-readable indicia. The version may correspond to a version of software used to generate the machine-readable indicia. The version may also correspond to a version of software to be used with the transcriber that will regenerate the ballot. In the illustrated example, the value of the version parameter 402 is 1.2.

The information includes a ballot-design-id parameter 404. The ballot-design-id parameter 404 names a digital file that can be used for remaking the voter-generated ballot. The digital file includes a template that provides formatting information for use in remaking the voter-generated ballot. The value of the ballot-design-id parameter 404 may depend on the supplier of the Election Management System or ballot scanner used.

The information includes a ballot-style parameter 406. The value of the ballot-style parameter 406 identifies a digital file that will be used for remaking the voter-generated ballot. The ballot presented to the voter may be generated from, or otherwise related to, the file used for remaking.

The information includes a ballot-type parameter 408. The value of the ballot-type parameter 408 defines the election system that is associated with the remade ballot. Each election system may have unique method for marking ballots, such as ovals or arrows. The value of the ballot-type parameter 408 can be used in remaking the ballot to determine how print and format the remade ballot. The value ballot-type parameter 408 may be based on an enumerated list of types, for example, 1=ES&S (Unity) (Ovals), 2=Premier (Gems) (Ovals), 3=Sequoia (Arrow), and 4=Hart The information includes an id parameter 410. The value of the id parameter 410 provides the ballot receipt id. The ballot receipt id is typically printed on the ballot and retained by the voter. However, the ballot receipt id does not identify the actual voter. The ballot receipt id can be used to determine uniqueness of all printed pages submitted and allow voters to track ballots, as required by the Help America Vote Act (HAVA). Additionally, the ballot receipt id may be used to verify the marks between the remade ballot and the original voter-generated ballot.

The information includes a remake-type parameter 412. The value of the remake-type parameter 412 can signal whether to remake the voter-generated ballot. Voter-generated ballots that are not remade can be identified and sorted for alternate processing, for example, manual review by election officials. A value of filled may be used to signal that the voter-generated ballot is to be remade; a value of none may be used to signal that the voter-generated ballot is not to be remade.

The remake-type parameter 412 for some voter-generated ballots may be set to indicate that the ballots should not be remade when the ballot includes information that is not included in the machine-readable indicia. This can occur, for example, when the ballot includes a large number of write-in votes or write-in votes with names that are too long for the format of the machine-readable indicia. This can also occur when ballot includes characters that are not supported.

The information includes choices 220*a-n* elected by the voter for contests in the election. The contests, in the example of FIG. 4, are identified by race numbers. The selections can be signaled by candidate numbers. The race numbers and candidate numbers are listed as name-value pairs. The race numbers and candidate numbers map to particular races and candidates. The mapping may depend on other information, such as the ballot-design-id parameter 404 and ballot-style parameter 406.

Choices 220*a-c* and 220*e-k* show simple, vote-for-one marks. These choices include one race number and one candidate number.

If the voter leaves a race unmarked, that race can be omitted from the information encoded in the machine-readable indicia. In the example information of FIG. 4, the fourth race 220*d* is omitted.

The information may include voter choices for other than vote-for-one races. For example, the twelfth race 220*l* shows the information for a multiple-marks race where the voter is allowed to chose more than one candidate.

The information may also include write-in choices. In FIG. 4, the thirteenth race 220*m* illustrates a single write-in candidate and the fourteenth race 220*n* illustrates multiple write-in candidates in one race. The write-in choices can be enclosed in quotes and separated by commas. The write-in names are preceded by their position numbers.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method comprising:
 receiving a voter-generated ballot including a human-readable representation of one or more choices of a voter and a machine-readable indicia that encodes an indication of the one or more choices of the voter, the machine-readable indicia further comprising one or more parameters for generating a remade ballot, the one or more parameters specifying formatting information and contents of the remade ballot;
 scanning the machine-readable indicia of the voter-generated ballot;
 decoding the scanned machine-readable indicia to determine the one or more choices of the voter;
 generating the remade ballot based on the one or more parameters, the remade ballot including the indication of the one or more choices of the voter; and
 printing the remade ballot, the printed remade ballot being readable by a ballot scanner,
 wherein the receiving, the scanning, the decoding, the generating, and the printing are performed by at least one processor.

2. The method of claim 1, wherein the one or more parameters includes one or more of the following:
   a ballot design parameter identifying a file used to remake the voter-generated ballot, the file containing the formatting information for the remade ballot, and
   a ballot type parameter defining one or more symbols for representing a marked ballot.

3. The method of claim 1 further comprising:
   comparing the human-readable representation of the one or more choices of the voter to the decoded choices of the voter to determine a discrepancy; and
   tagging, based on the discrepancy, the voter-generated ballot for manual processing,
   wherein the comparing and the tagging are performed by at least one processor.

4. The method of claim 1 further comprising:
   tracking a ballot submission of a voter as having been received based on the decoding the scanned machine-readable indicia,
   wherein the tracking is performed by at least one processor.

5. The method of claim 1, wherein the voter-generated ballot is received by way of a postal service, by way of a private delivery service, or by scanning a display of a client device of the voter.

6. The method of claim 1, wherein the machine-readable indicia is a barcode.

7. A system comprising:
   at least one processor; and
   at least one memory, wherein the at least one processor and the at least one memory are configured to perform operations comprising:
   receiving a voter-generated ballot including a human-readable representation of one or more choices of a voter and a machine-readable indicia that encodes an indication of the one or more choices of the voter, the machine-readable indicia further comprising one or more parameters for generating a remade ballot, the one or more parameters specifying formatting information and contents of the remade ballot;
   scanning the machine-readable indicia of the voter-generated ballot;
   decoding the scanned machine-readable indicia to determine the one or more choices of the voter;
   generating the remade ballot based on the one or more parameters, the remade ballot including the indication of the one or more choices of the voter; and
   printing the remade ballot, the printed remade ballot being readable by a ballot scanner.

8. The system of claim 7, wherein the one or more parameters includes one or more of the following:
   a ballot design parameter identifying a file used to remake the voter-generated ballot, the file containing the formatting information for the remade ballot, and
   a ballot type parameter defining one or more symbols for representing a marked ballot.

9. The system of claim 7, the operations further comprising:
   comparing the human-readable representation of the one or more choices of the voter to the decoded choices of the voter to determine a discrepancy; and
   tagging, based on the discrepancy, the voter-generated ballot for manual processing.

10. The system of claim 7, the operations further comprising:
   tracking a ballot submission of a voter as having been received based on the decoding the scanned machine-readable indicia.

11. The system of claim 7, wherein the voter-generated ballot is received by way of a postal service, by way of a private delivery service, or by scanning a display of a client device of the voter.

12. The system of claim 7, wherein the machine-readable indicia is a barcode.

13. A non-transitory computer-readable medium containing instructions to configure a processor to perform operations comprising:
   receiving a voter-generated ballot including a human-readable representation of one or more choices of a voter and a machine-readable indicia that encodes an indication of the one or more choices of the voter, the machine-readable indicia further comprising one or more parameters for generating a remade ballot, the one or more parameters specifying formatting information and contents of the remade ballot;
   scanning the machine-readable indicia of the voter-generated ballot;
   decoding the scanned machine-readable indicia to determine the one or more choices of the voter;
   generating the remade ballot based on the one or more parameters, the remade ballot including the indication of the one or more choices of the voter; and
   printing the remade ballot, the printed remade ballot being readable by a ballot scanner.

14. A method comprising:
   receiving a voter-generated ballot including a human-readable representation of one or more choices of a voter and a machine-readable indicia that encodes an indication of the one or more choices of the voter, the machine-readable indicia further comprising an identifier for generating a remade ballot;
   scanning the machine-readable indicia of the voter-generated ballot;
   decoding the scanned machine-readable indicia to determine the one or more choices of the voter;
   searching a server for one or more parameters for formatting the remade ballot, the searching based on the identifier;
   generating the remade ballot based on the one or more parameters, the remade ballot including the indication of the one or more choices of the voter; and
   printing the remade ballot, the printed remade ballot being readable by a ballot scanner,
   wherein the receiving, the scanning, the decoding, the searching, the generating, and the printing are performed by at least one processor.

15. The method of claim 14, wherein the one or more parameters specify formatting information and contents of the remade ballot.

16. The method of claim 14, wherein the one or more parameters includes one or more of the following:
   a ballot design parameter identifying a file used to remake the voter-generated ballot, the file containing the formatting information for the remade ballot, and
   a ballot type parameter defining one or more symbols for representing a marked ballot.

17. The method of claim 14 further comprising:
   comparing the human-readable representation of the one or more choices of the voter to the decoded choices of the voter to determine a discrepancy; and
   tagging, based on the discrepancy, the voter-generated ballot for manual processing, wherein the comparing and the tagging are performed by at least one processor.

18. The method of claim 14 further comprising:
tracking a ballot submission of a voter as having been received based on the decoding the scanned machine-readable indicia,
wherein the tracking is performed by at least one processor.

19. The method of claim 14, wherein the voter-generated ballot is received by way of a postal service, by way of a private delivery service, or by scanning a display of a client device of the voter.

20. The method of claim 14, wherein the machine-readable indicia is a barcode.

21. A system comprising:
at least one processor; and
at least one memory, wherein the at least one processor and the at least one memory are configured to perform operations comprising:
receiving a voter-generated ballot including a human-readable representation of one or more choices of a voter and a machine-readable indicia that encodes an indication of the one or more choices of the voter, the machine-readable indicia further comprising an identifier for generating a remade ballot;
scanning the machine-readable indicia of the voter-generated ballot;
decoding the scanned machine-readable indicia to determine the one or more choices of the voter;
searching a server for one or more parameters for formatting the remade ballot, the searching based on the identifier;
generating the remade ballot based on the one or more parameters, the remade ballot including the indication of the one or more choices of the voter; and
printing the remade ballot, the printed remade ballot being readable by a ballot scanner.

22. The system of claim 21, wherein the one or more parameters specify formatting information and contents of the remade ballot.

23. The system of claim 21, wherein the one or more parameters includes one or more of the following:
a ballot design parameter identifying a file used to remake the voter-generated ballot, the file containing the formatting information for the remade ballot, and
a ballot type parameter defining one or more symbols for representing a marked ballot.

24. The system of claim 21, the operations further comprising:
comparing the human-readable representation of the one or more choices of the voter to the decoded choices of the voter to determine a discrepancy; and
tagging, based on the discrepancy, the voter-generated ballot for manual processing.

25. The system of claim 21, the operations further comprising:
tracking a ballot submission of a voter as having been received based on the decoding the scanned machine-readable indicia.

26. The system of claim 21, wherein the voter-generated ballot is received by way of a postal service, by way of a private delivery service, or by scanning a display of a client device of the voter.

27. The system of claim 21, wherein the machine-readable indicia is a barcode.

28. A non-transitory computer-readable medium containing instructions to configure a processor to perform operations comprising:
receiving a voter-generated ballot including a human-readable representation of one or more choices of a voter and a machine-readable indicia that encodes an indication of the one or more choices of the voter, the machine-readable indicia further comprising an identifier for generating a remade ballot;
scanning the machine-readable indicia of the voter-generated ballot;
decoding the scanned machine-readable indicia to determine the one or more choices of the voter;
searching a server for one or more parameters for formatting the remade ballot, the searching based on the identifier;
generating the remade ballot based on the one or more parameters, the remade ballot including the indication of the one or more choices of the voter; and
printing the remade ballot, the printed remade ballot being readable by a ballot scanner.

* * * * *